US012694173B2

(12) United States Patent
Touboul et al.

(10) Patent No.: US 12,694,173 B2
(45) Date of Patent: Jul. 28, 2026

(54) METHOD FOR SUPPLYING VALUES OF PARAMETERS OF A HEAT SOURCE INTENDED TO CREATE A WELDED SEAM BETWEEN TWO PLATES, CORRESPONDING COMPUTER PROGRAM AND CORRESPONDING DEVICE

(71) Applicant: Safran Aircraft Engines, Paris (FR)

(72) Inventors: Mathieu Hervé Touboul, Moissy-Cramayel (FR); Virgile Pierre-Olivier Marguin, Moissy-Cramayel (FR); François Pichot, Moissy-Cramayel (FR)

(73) Assignee: SAFRAN AIRCRAFT ENGINE, Paris (FR)

( * ) Notice: Subject to any disclaimer, the term of this patent is extended or adjusted under 35 U.S.C. 154(b) by 729 days.

(21) Appl. No.: 18/014,534

(22) PCT Filed: Jul. 2, 2021

(86) PCT No.: PCT/FR2021/051210
§ 371 (c)(1),
(2) Date: Jan. 5, 2023

(87) PCT Pub. No.: WO2022/008821
PCT Pub. Date: Jan. 13, 2022

(65) Prior Publication Data
US 2023/0249275 A1 Aug. 10, 2023

(30) Foreign Application Priority Data
Jul. 10, 2020 (FR) ....................................... 2007370

(51) Int. Cl.
| | |
|---|---|
| *G06F 30/20* | (2020.01) |
| *B23K 9/095* | (2006.01) |
| *B23K 31/12* | (2006.01) |
| *G06F 119/08* | (2020.01) |

(52) U.S. Cl.
CPC .............. *G06F 30/20* (2020.01); *B23K 9/095* (2013.01); *B23K 31/12* (2013.01); *G06F 2119/08* (2020.01)

(58) Field of Classification Search
CPC ......... B23K 9/095; B23K 31/12; G06F 30/20; G06F 2119/08
See application file for complete search history.

(56) References Cited

U.S. PATENT DOCUMENTS 10,837,945 B1 * 11/2020 Abushanab ........ G01N 29/4436

FOREIGN PATENT DOCUMENTS

| | | |
|---|---|---|
| CN | 102637235 A | 8/2012 |
| CN | 107967376 A | 4/2018 |

(Continued)

OTHER PUBLICATIONS

International Patent Application No. PCT/FR2021/051210, International Search Report (and translation) and Written Opinion, mailed Nov. 3, 2021.

(Continued)

*Primary Examiner* — Woody A Lee, Jr.
(74) *Attorney, Agent, or Firm* — Kilpatrick Townsend & Stockton LLLP

(57) ABSTRACT

This method comprises: receipt of a desired value of at least one spatial characteristic of the welded seam; determination of several samples of the parameters of the heat source; for each sample, determination of a value for each spatial characteristic of the welded seam for this sample; several successive iterations of the following steps: the determination of extrapolated points, from simulated points, determination of a target point, of the function, at which each spatial characteristic of the welded seam exhibits a value close to the desired value, and determination of a value for each spatial characteristic of the welded seam from the values of (Continued)

the parameters of the heat source for the target point, so as to obtain a new simulated point; and the supply of the values of the parameters of the heat source of the target point obtained in the last iteration.

10 Claims, 7 Drawing Sheets

(56) References Cited

FOREIGN PATENT DOCUMENTS

| | | | | | |
|---|---|---|---|---|---|
| CN | 109766663 | A | | 5/2019 | |
| CN | 110539100 | A | * | 12/2019 | ............. B23K 35/40 |
| CN | 110705159 | A | | 1/2020 | |
| CN | 110866359 | A | * | 3/2020 | ............. B23K 31/02 |
| CN | 119347020 | A | * | 1/2025 | ............. B25J 9/1679 |
| JP | 2015536447 | A | * | 12/2015 | ........... B23K 9/0035 |
| JP | 2018049291 | A | * | 3/2018 | ............. B23K 9/321 |

OTHER PUBLICATIONS

Andreas Pittner, "A Contribution to the Solution of the Inverse Heat Conduction Problem in Welding Simulation", Berlin, Jan. 1, 2012, pp. 1-213, https://opus4.kobv.de/opus4-bam/files/73/diss85_vt.pdf, XP055292935.

Chen Changrong et al., "Study of Heat Source Calibration and Modelling for Laser Welding Process", *International Journal of Precision Engineering and Manufacturing, Korean Society for Precision Engineering*, Springer, vol. 19, No. 8, Aug. 14, 2018, pp. 1239-1244, XP036570028.

William Perret, "Welding Simulation of Complex Automotive Welded Assembly—Possibilities and Limits of the Application of Analytical Temperature Field Solutions", *BAM-Dissertationsreihe—Band 108*, May 31, 2013, pp. 1-183, https://opus4.kobv.de/opus4-bam/files/50/diss108_vt.pdf, XP055790172.

Junqiang Wang et al., "Development of a new combined heat source model for welding based on a polynomial curve fit of the experimental fusion line", *The International Journal of Advanced Manufacturing Technology*, Springer, London, vol. 87, No. 5, Mar. 15. 2016, pp. 1985-1997, XP036086282.

Chinese Application No. 202180048581.4, Office Action mailed on Sep. 4, 2025, 12 pages (10 pages of Original Document and 2 pages of English Translation).

International Application No. PCT/FR2021/051210, International Preliminary Report on Patentability mailed on Jan. 19, 2023, 17 pages (9 pages of Original Document and 8 pages of English Translation).

\* cited by examiner

[Fig. 1]
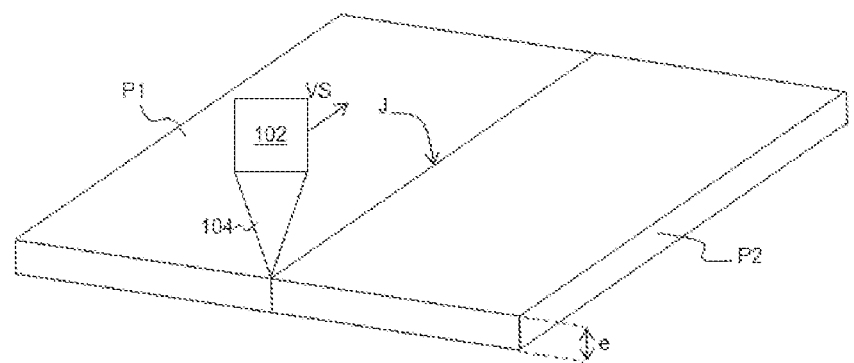

[Fig. 2]
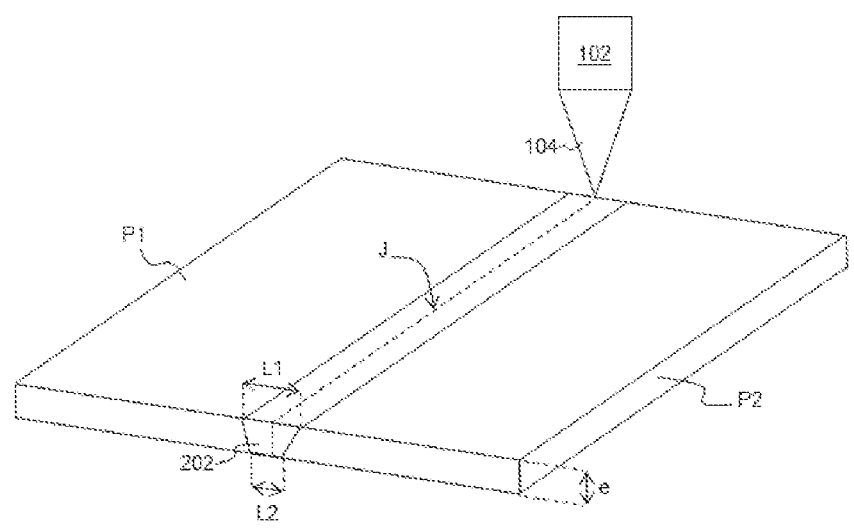

[Fig. 3]
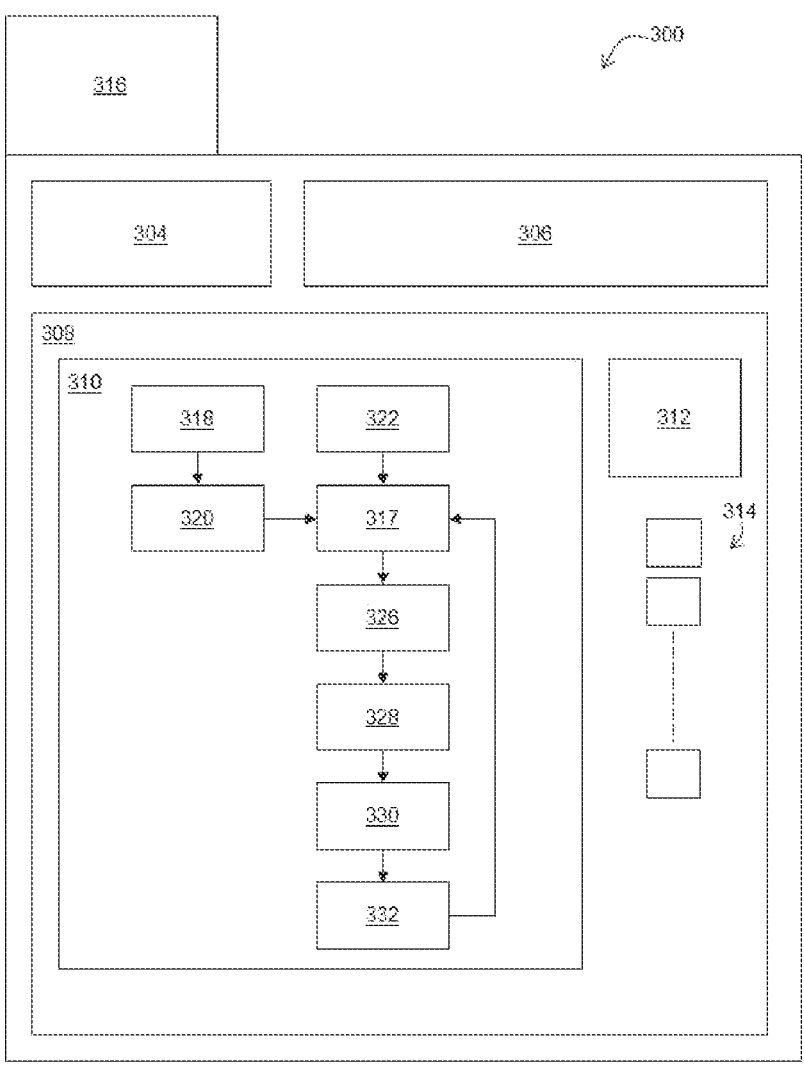

[Fig. 4]
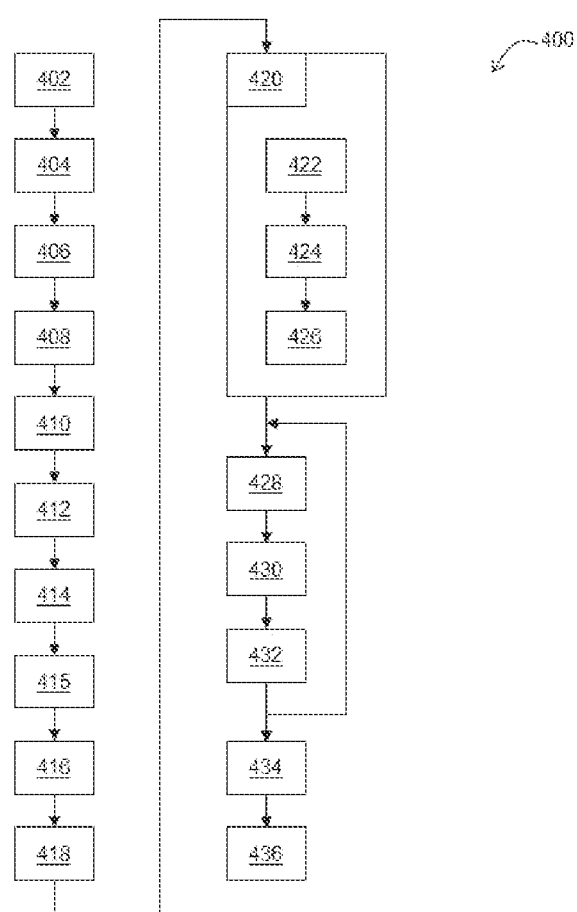

[Fig. 5]
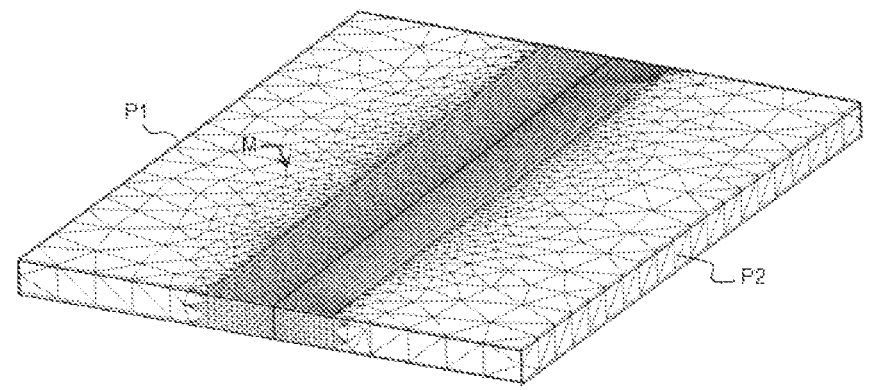

[Fig. 6]
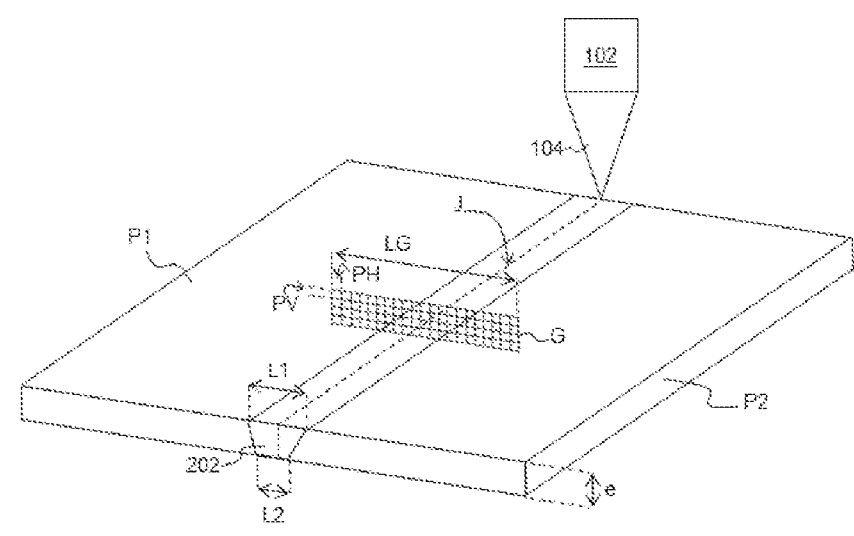

[Fig. 7]
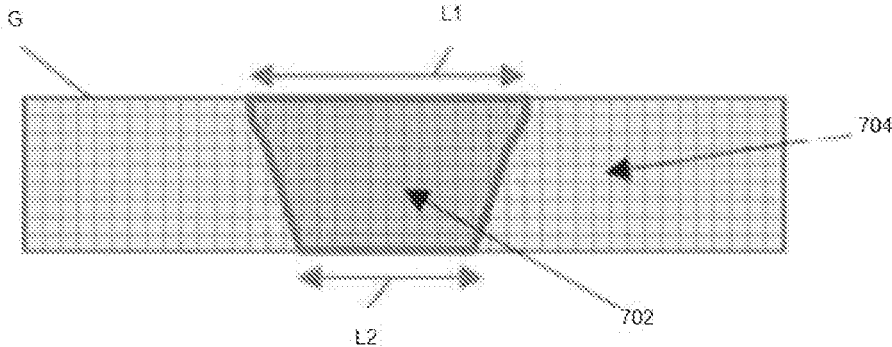

METHOD FOR SUPPLYING VALUES OF PARAMETERS OF A HEAT SOURCE INTENDED TO CREATE A WELDED SEAM BETWEEN TWO PLATES, CORRESPONDING COMPUTER PROGRAM AND CORRESPONDING DEVICE

CROSS REFERENCE TO RELATED APPLICATIONS

This application is a national phase application of International Patent Application PCT/FR2021/051210 ("the '210 application"), filed on Jul. 2, 2021 and titled "METHOD FOR SUPPLYING VALUES OF PARAMETERS OF A HEAT SOURCE INTENDED TO CREATE A WELDED SEAM BETWEEN TWO PLATES, CORRESPONDING COMPUTER PROGRAM AND CORRESPONDING DEVICE," which application is related to and claims priority benefits of France Patent Application No. 2007370 ("the '370 application"), filed on Jul. 10, 2020. The '210 and '370 applications are hereby incorporated in their entireties by this reference.

The present invention relates to a method for supplying values of parameters of a heat source intended to create a welded seam between two plates, a corresponding computer program and a corresponding device.

It is known to proceed as follows to obtain values of parameters of a heat source for making a welded seam between two plates.

A user obtains a desired value of at least one spatial characteristic of the welded seam.

The user determines a value of each spatial characteristic of the welded seam from the values of parameters of the heat source by simulation on a three-dimensional mesh of the two plates. A thermomechanical solver with transient calculation is usually used for the simulation.

The user repeats the previous step by changing the values of the parameters of the heat source by hand until values are found that give, for each considered spatial characteristic of the welded seam, a value close to the desired value.

A disadvantage of this known method is that it requires the user to be familiar with the operation of the solver, to supply relevant input data, but also to interpret the output of the solver. However, the user is often skilled in welded seams, but not in numerical simulation.

It may therefore be desirable to supply a method for supplying values of parameters for a heat source intended to create a welded seam between two plates which allows at least some of the above-mentioned problems and constraints to be overcome.

A method is therefore proposed for supplying values of parameters of a heat source intended to create a welded seam between two plates, characterised in that it comprises the following steps:

receiving a desired value of at least one spatial characteristic of the welded seam;

determining several samples of the parameters of the heat source;

for each sample, determining a value of each spatial characteristic of the welded seam for this sample, by simulation on a three-dimensional mesh of the two plates, in order to obtain a point, referred to as the simulated point, of a function linking the spatial characteristic or characteristics of the welded seam to the parameters of the heat source;

several successive iterations of the following steps:

determining points, referred to as extrapolated points, of the function by extrapolation from the simulated points, determining a point, called the target point, of the function, where each spatial characteristic of the welded seam has a value close to the desired value, and determining a value of each spatial characteristic of the welded seam from the values of the parameters of the heat source for the target point by simulation on the three-dimensional mesh of the two plates in order to obtain a new simulated point to complement the other simulated points; and supplying the values of the parameters of the heat source of the target point obtained in the last iteration.

Thus, the invention supplies a robust and reliable method of supplying the parameters of the heat source, which does not require any particular knowledge of numerical simulation and can be easily automated by being implemented by a computer system.

Optionally, the method further comprises a step of receiving measurement positions in the mesh and each determination of a value of each spatial characteristic of the welded seam is created from a time evolution of a temperature measured at each measurement position.

Optionally, the measurement positions are located at intersections of a grid and the step of receiving the measurement positions in the mesh comprises a step of receiving at least one of the following: a pitch of the grid and a dimension of the grid.

Optionally also, the method further comprises the following steps:

receiving a dimension of at least one of the plates; and determining the mesh by modifying a reference mesh of two plates from the received dimension.

Optionally also, the received dimension is a thickness of at least one of the plates, the reference mesh comprises points having coordinates along a direction of a thickness, called the reference thickness, of at least one of the two plates meshed by the reference mesh, and the step of determining the mesh comprises transforming these coordinates by a homothety with a ratio equal to a ratio between the reference thickness and the received thickness.

Optionally also, the modified reference mesh is selected from a set of reference meshes.

Optionally also, the reference meshes of the set have been previously used in respective reference simulations of welded seams validated by comparison with respectively the actually created welded seams.

Optionally also, the step of determining the samples is performed by pseudo-random sampling, e.g., Latin hypercube.

Also proposed is a computer program downloadable from a communication network and/or stored on a computer-readable medium, characterized in that it comprises instructions for performing the steps of a method according to the invention, when said program is executed on a computer.

Also proposed is a device for supplying values of parameters of a heat source intended to create a welded seam between two plates, characterised in that it comprises:

an interface module designed to receive a desired value of at least one spatial characteristic of the welded seam;

a sampling module designed to determine several samples of the parameters of the heat source;

a spatial characterization module designed, for each sample, to determine a value of each spatial characteristic of the welded seam for that sample, using a simulation on a three-dimensional mesh of the two plates, in order to obtain a point, referred to as the simulated point, of a function relating the spatial characteristic(s) of the welded seam to the parameters of the heat source;

an extrapolation module designed to determine points, referred to as extrapolated points, of the function by extrapolation from the simulated points; and a search module designed to determine a point, referred to as target point, of the function where each spatial characteristic of the welded seam has a value close to the desired value;

wherein the spatial characterization module is further adapted to determine a value of each spatial characteristic of the welded seam from the values of the heat source parameters for the target point, using a simulation on the three-dimensional mesh of the two plates, in order to obtain a new simulated point to complement the other simulated points.

The invention will be better understood with the aid of the following description, given only by way of example and made with reference to the attached drawings in which:

FIG. 1 is a three-dimensional view of two plates joined together and of a heat source intended to create a welded seam between the two plates, FIG. 2 is a three-dimensional view of the two plates of FIG. 1, once the welded seam has been created, FIG. 3 is a simplified representation of a device according to the invention, for supplying values of parameters of the heat source of FIGS. 1 and 2, FIG. 4 is a block diagram illustrating the steps of a method according to the invention, for making the welded seam of FIG. 2, FIG. 5 is a three-dimensional view of the two plates of FIGS. 1 and 2, with a three-dimensional mesh of these two plates, FIG. 6 is a three-dimensional view of the two plates of FIGS. 1, 2 and 5, with a measuring grid, and FIG. 7 is a front view of the measuring grid of FIG. 6.

With reference to FIG. 1, two plates P1, P2 intended to be welded together by a welded seam are shown. In the example described, the plates P1, P2 are coplanar and have the same thickness e and respective straight edges adjoining each other so as to form a joint J between them. It is at this junction J that the welded seam is intended to be formed, by advancing, along the junction J, a nozzle 102 projecting a heat source 104 towards the junction J on one side of the two plates P1, P2, called the right side. The other side is called the reverse side. The nozzle 102, and thus also the heat source 104, is intended to advance at a constant welding speed VS in the example described.

The formed welded seam is shown in FIG. 2 where it is designated by the reference 202. As can be seen in this figure, the welded seam 202 has, perpendicular to the seam J, a width L1 on the right side, referred to as the right side width, and a width L2 on the reverse side, referred to as the reverse side width.

With reference to FIG. 3, an example of a device 300 according to the invention will now be described. This device 300 is designed to supply parameter values of the heat source 104 intended to create the welded seam 202 between the two plates P1, P2.

In the example described, the device 300 is a computer system comprising a processing unit 304 (such as a microprocessor) and a main memory 306 (such as a RAM memory, Random Access Memory) accessible by the processing unit 304. The computer system 302 further comprises a mass memory 308 (such as a hard disk, local or remote and accessible via a communication network) in which a computer program 310 containing instructions for the processing unit 304 is stored. This computer program 310 is intended to be loaded into the main memory 306, so that the processing unit 304 can execute its instructions. The instructions of the computer program 310 are organised into software modules which will be described later.

Alternatively, all or part of these modules could be implemented as hardware modules, i.e., in the form of an electronic circuit, for example micro-wired, not involving a computer program.

A database 312 is also stored in the mass memory 308. This database 312 supplies, for each of several materials, a melting temperature of that material and behavioural laws of that material.

In addition, one or more reference simulations 314 are stored in the mass memory 308. Each reference simulation 314 includes an input model for a solver 317, to be described later, to simulate a welded seam between two plates. In particular, each input model comprises a mesh of the plates that are the subject of the simulation. It further comprises a material or materials from which these plates are formed and parameters of the heat source used in the simulation, such as the parameters that will be detailed later. Each reference simulation 314 further comprises a result of that simulation, in particular parameter values of the welded seam obtained by that simulation, such as parameters that will be detailed later.

The device 300 further comprises a human/machine interface 316 comprising, for example, an output device such as a display device (e.g., a screen) and an input device such as a keyboard and/or a mouse.

The modules of the computer program 310 will now be briefly described. The functions they perform will be described in more detail with reference to FIG. 4.

Firstly, the computer program 310 comprises the solver 317. It is at least a thermal solver with transient calculation. In the example described, it is a thermomechanical solver. The solver 317 is designed to simulate over time the making of a welded seam between two plates from an input model, i.e., to supply at least the evolution over time of the temperature of each point of the mesh of the input model supplied to it.

The computer program 310 further comprises an interface module 318 designed to receive information from a user, for example through the human/machine interface 316.

The computer program 310 further comprises an initialization module 320 designed to prepare input data to be supplied to the solver 317.

The computer program 310 further comprises a sampling module 322 designed to supply samples of the parameters of the heat source 104 and to successively supply them to the solver 317 in addition to the input data determined by the initialization module 320.

The computer program 310 further comprises a measurement module 326 designed to supply, from the output of the solver 317, the evolution over time of at least the temperature at a plurality of measurement positions previously defined through the interface module 328.

The computer program 310 further comprises a spatial characterization module 328 designed to supply spatial characteristics of the welded seam 202 from the temporal evolutions of at least the temperature at the measurement positions.

Thus, for each sample, a point, called simulated, of a function relating the spatial characteristic(s) L1, L2 of the welded seam 202 to the parameters PS, GS, VS of the heat source 104, is obtained.

The computer program 310 further comprises an extrapolation module 330 designed to supply extrapolated points from the simulated points.

The computer program 310 further comprises a search module 332 designed to search for a target point of the function, i.e., a point whose values of the welded seam 202 are close to desired values received by the interface module 318. The search module 332 is further designed to supply the solver 317 with values of the parameters of the heat source 104 of the found target point, in order to obtain a new simulated point.

With reference to FIG. 4, an example of a method 400 according to the invention for making a welded seam will now be described.

In a step 402, simulations of welded seams between pairs of plates are performed.

In a step 404, the simulations are compared with the actual welded seams in order to select the valid simulations, i.e., those that faithfully represent the actual welded seam.

In a step 406, at least one simulation selected in step 404 is stored in the mass memory 308 as a reference simulation 314.

In a step 408, the interface module 318 receives desired values of parameters of the welded seam 202 between the plates P1, P2 from a user.

In particular, the parameters of the welded seam 202 received by the interface module 318 comprise a desired value of at least one spatial characteristic of the welded seam 202. In the example described, the spatial characteristics are the right-side length L1 and the reverse side length L2 of the welded seam 202. Alternatively, a spatial characteristic of the welded seam 202 could be the area of a transverse face of the welded seam 202. The other parameters of the welded seam 202 comprise, again in the example described, one or more of: the thickness e of the plates P1, P2, a material or materials from which the plates P1, P2 are formed, and the welding speed VS.

In a step 410, the initialization module 320 retrieves, from the database 312, the melting temperature and behaviour laws of each material received in the step 408.

In a step 412, the interface module 318 receives a selection of a reference simulation 314 from a user. This allows the user to select a reference simulation whose input model is close to the desired welded seam 202.

Alternatively, the interface module 318 receives geometric characteristics of the plates P1, P2 and/or the material(s) from which they are formed and/or parameters of the welded seam 202 (such as the parameters detailed above). The initialization module 320 then selects the reference simulation 314 closest to the information received.

In a step 414, the initialization module 320 retrieves the mesh of the reference simulation selected in the step 412. This mesh is referred to hereafter as the reference mesh and denoted M*.

In a step 415, in order to determine a mesh M of the plates P1, P2 (shown in FIG. 5), the initialization module 320 modifies the reference mesh M* from at least one dimension of the plates P1, P2, namely in the described example the thickness e received in step 408. The points of the reference mesh M* have respective coordinates along a direction of a thickness, called reference thickness, of at least one of two plates meshed by this reference mesh M*. Thus, the determination of the mesh M comprises the transformation of these coordinates by a homothety in the direction of the reference thickness with a ratio equal to a ratio between the reference thickness and the thickness e:

$$Z = \frac{e}{e^*} Z^* \qquad \text{[Math. 1]}$$

where Z* is the coordinate in the direction of the reference thickness of a point in the reference mesh M* and Z is the coordinate of the same point in the mesh M.

Preferably, the coordinates of the points of the reference mesh M* in the other orthogonal directions are left unchanged, and are therefore identical in the mesh M.

The use of a reference mesh M* to determine the mesh M allows to benefit from feedback on simulations already carried out. In particular, starting with a reference mesh M* that has already given good results increases the chances that the mesh M is sufficiently converged, i.e., that it allows the solver 317 to supply a representative mapping of the real welded seam.

In a step 416, the interface module 318 receives a measurement positions in the mesh M from a user. These measurement positions constitute "virtual sensors" that are not necessarily located on points of the mesh M. Preferably, the measurement positions are positioned on a grid transverse to the welded seam 202.

This grid is shown in FIG. 6 where it is referred to as G. The grid G has intersections on at least part of which the virtual sensors are positioned. Preferably, the grid G has a height at least equal to the thickness e of the plates P1, P2. In the embodiments where the grid G is used, the interface module 118 receives for example from the user parameters of the grid G such as one or more of the following: a horizontal pitch PH (parallel to the front and/or back side), a grid width LG (perpendicular to the front and/or back side) and a vertical pitch PV (perpendicular to the front and/or back side).

Returning to FIG. 4, in a step 418, the sampling module 322 determines several sample parameters of the heat source 104. These parameters comprise, for example, at least one of the following: a power parameter PS of the heat source 104, several parameters GS characterizing a three-dimensional geometry of the heat source 104, and the welding speed VS. Each sample thus groups values of the parameters PS, GS, VS of the heat source 104. Preferably, this determination of the samples is performed by pseudo-random sampling. In the example described, the pseudo-random sampling is the Latin hypercube. In this case, at least thirty samples are preferably selected.

In a step 420, the computer program 310 determines, for each sample, a value of each spatial characteristic L1, L2 of the welded seam 202 for the values of the parameters PS, GS, VS of the heat source 104 of the considered sample. More precisely, this determination uses a simulation carried out by the solver 317 on the mesh M. The step 420 thus allows to obtain, for each sample, a point, referred to as the simulated point, of the function relating the spatial characteristic(s) L1, L2 of the welded seam to the parameters PS, GS, VS of the heat source 104.

In the example described, the step 420 comprises the following steps 422, 424, 426.

In a step 422, the solver 317 receives the values of the parameters of the heat source 104 of the current sample, the mesh M, the welding speed VS, the melting temperature and the behaviour laws of each material of the plates P1, P2. The solver 317 then performs at least a thermal simulation of the weld by solving equations of the heat, such as the Fourier equation (where q denotes the amount of heat here):

$$\rho C_p \frac{\partial T}{\partial t} - q - (\nabla \lambda \nabla T) = 0 \qquad \text{[Math. 2]}$$

T: Temperature
λ: thermal conductivity
ρ: density
$C_p$: specific heat

In one embodiment, the simulation performed may also be mechanical, in addition to the thermal aspect.

The solver 317 then supplies as output a map of the welded seam 202. This mapping indicates the evolution over time of the temperature (and possibly the displacement) of each point of the mesh M.

During a step 424, the measurement module 326 determines, from the map supplied by the solver 317, the time evolution of the temperature and, if applicable, the displacement, at each measurement position.

In a step 426, the spatial characterization module 328 determines at least one spatial characteristic of the welded seam 202, the face dimension L1 and the reverse dimension L2 in the described example, from at least a part of the time evolutions of at least a part of the measurement positions. In the example described, the spatial characterization module 328 determines the maximum temperature reached for each measurement position and compares it to the melting temperature of the material at that measurement position. The spatial characterization module 328 then determines the number of consecutive measurement positions on the right-hand side of the plates P1, P2 whose maximum temperature exceeds the melting temperature and derives the right-hand length L1 of the welded seam 202. This right-side length L1 is for example taken to be equal to the number determined (minus 1) multiplied by the horizontal pitch PH of the grid G. Similarly, in the example described, the spatial characterization module 328 determines the number of consecutive measurement positions located on the reverse side of the plates P1, P2 whose maximum temperature exceeds the melting temperature and derives the reverse length L2 of the welded seam 202. This backside length L2 is, for example, taken to be equal to the number determined (minus 1) multiplied by the horizontal pitch PH of the grid G.

FIG. 7 illustrates the zone 702 of the G grid grouping the intersections where the maximum temperature exceeds the melting temperature and the zone 704 grouping the intersections where the maximum temperature remains below the melting temperature.

The use of the virtual sensors allows the computer program 310 to determine the spatial characteristics L1, L2 in a stable manner from one determination to the next.

In case the cross-sectional area of the welded seam 202 is used as a spatial characteristic, the spatial characterization module 328 determines this area from, for example, the number of measurement positions whose maximum temperature exceeds the melting temperature (i.e., the number of intersections of the grid G included in the zone 702), the horizontal pitch PH and the vertical pitch PV.

In other embodiments, the evolution over time of the displacement of at least some of the measurement positions may also be used to determine a spatial characteristic of the welded seam 202.

Back to FIG. 4, at the end of step 420, a set of simulated points is thus obtained.

The method 400 then comprises several successive iterations of the following steps 428, 430, 432.

During a step 428, the extrapolation module 330 determines points, referred to as extrapolated points, of the function by extrapolation from the simulated points.

In a step 430, the search module 332 determines a point of the function, called target point, where each spatial characteristic L1, L2 of the welded seam 202 has a value close to the desired value.

In a step 432, the spatial characterization module 328 determines (e.g., in the same manner as described above) a value of each spatial characteristic L1, L2 of the welded seam 202 from the values of the parameters PS, GS, VS of the heat source 104 for the target point. Thus, a new simulated point of the function is obtained, which point combines the values of the parameters PS, GS, VS of the heat source 104 for the target point and the value of each spatial characteristic L1, L2 of the welded seam 202 obtained in step 432. This new simulated point complements the other simulated points for the next iteration.

The reiteration of the previous steps 428, 430, 432 is preferably stopped when a predefined condition is achieved, for example after a predefined number of iterations or when the values of the spatial features L1, L2 found in the last iteration are very close to the values found in the previous iteration.

In a step 434, the computer program 310 supplies the values of the parameters PS, GS, VS of the heat source 302 of the target point obtained in the last iteration of the steps 428, 430, 432.

In a step 436, the welded seam 302 is made from the heat source 104 parameterised according to the values supplied by the computer program 310.

It is clear that a method such as the one described above allows to obtain parameters of the heat source giving the desired welded seam.

It should also be noted that the invention is not limited to the embodiments described above. Indeed, it will be apparent to the person skilled in the art that various modifications can be made to the above-described embodiments, in the light of the teaching just disclosed.

In the above detailed presentation of the invention, the terms used should not be construed as limiting the invention to the embodiments set forth in the present description, but should be construed to include all equivalents the anticipation of which is within the reach of the person skilled in the art by applying his general knowledge to the implementation of the teaching just disclosed.

The invention claimed is:

1. A method for supplying values of parameters of a heat source for a welded seam between two plates, characterised in that it comprises the following steps:

receiving a desired value of at least one spatial characteristic of the welded seam;

determining samples of the parameters of the heat source;

for each sample, determining a value of each spatial characteristic of the welded seam for this sample, by simulation on a three-dimensional mesh of the two plates to obtain a simulated point of a function linking the spatial characteristic or characteristics of the welded seam to the parameters of the heat source;

successive iterations of the following steps:

determining extrapolated points of the function by extrapolation from the simulated points;

determining a target point of the function where each spatial characteristic of the welded seam has a value close to the desired value;

determining a value of each spatial characteristic of the welded seam from the values of the parameters of the heat source for the target point, by simulation on the three-dimensional mesh of the two plates, in order to obtain a new simulated point to complement the other simulated points; and supplying, to the heat source for creating the welded seam, the values of the parameters of the target point obtained in the last iteration.

2. The method according to claim 1, further comprising a step of receiving measurement positions in the mesh and wherein each determination of a value of each spatial characteristic of the welded seam is created from a time evolution of a temperature taken at each measurement position.

3. The method according to claim 2, wherein the measurement positions are located at intersections of a grid and wherein the step of receiving the measurement positions in the mesh comprises a step of receiving at least one of the following of a pitch of the grid and a dimension of the grid.

4. The method according to claim 1, further comprising the following steps:

receiving a dimension of at least one of the plates; and determining the mesh by modifying a reference mesh of two plates from the received dimension to form a modified reference mesh.

5. The method according to claim 4, wherein the dimension received is a thickness of at least one of the plates, in which the reference mesh comprises points having coordinates in a direction of a reference thickness of at least one of the two plates meshed by the reference mesh, and in which the step of determining the mesh comprises transforming these coordinates by a homothety with a ratio equal to a ratio of the reference thickness to the thickness received.

6. The method of claim 4, wherein the modified reference mesh is selected from a set of reference meshes.

7. The method according to claim 6, wherein the reference meshes of the set have been previously used in respective reference simulations of welded seams validated by comparison with respectively the welded seams.

8. The method according to claim 1, wherein the step of determining the samples is performed by pseudo-random sampling.

9. A computer program downloadable from at least one of a communication network and stored on a computer-readable medium, characterized in that it comprises instructions for performing the steps of a method according to claim 1, when said program is executed on a computer.

10. A system comprising:

(i) a device for supplying values of parameters to a heat source for a welded seam between two plates, characterised in that it comprises:

an interface module designed to receive a desired value of at least one spatial characteristic of the welded seam;

a sampling module adapted to determine samples of the parameters of the heat source;

a spatial characterization module designed, for each sample, to determine a value of each spatial characteristic of the welded seam for that sample, using a simulation on a three-dimensional mesh of the two plates, in order to obtain a simulated point of a function relating the at least one spatial characteristic of the welded seam to the parameters of the heat source;

an extrapolation module adapted to determine extrapolated points of the function by extrapolation from the simulated points; and a search module adapted to determine a target point of the function where each spatial characteristic of the welded seam has a value close to the desired value, wherein the spatial characterization module is further adapted to determine a value of each spatial characteristic of the welded seam from the values of the parameters of the heat source for the target point, using a simulation on the three-dimensional mesh of the two plates in order to obtain a new simulated point to complement the other simulated points; and (ii) the heat source configured to operate based on parameter values parametrized according to the values supplied by the device.

* * * * *